Dec. 6, 1949   R. H. HILL   2,490,688
ROTARY DISK PLOW
Filed April 9, 1946   2 Sheets-Sheet 1

Inventor
RALPH H. HILL,
By
Attorneys

Dec. 6, 1949  R. H. HILL  2,490,688
ROTARY DISK PLOW
Filed April 9, 1946  2 Sheets-Sheet 2
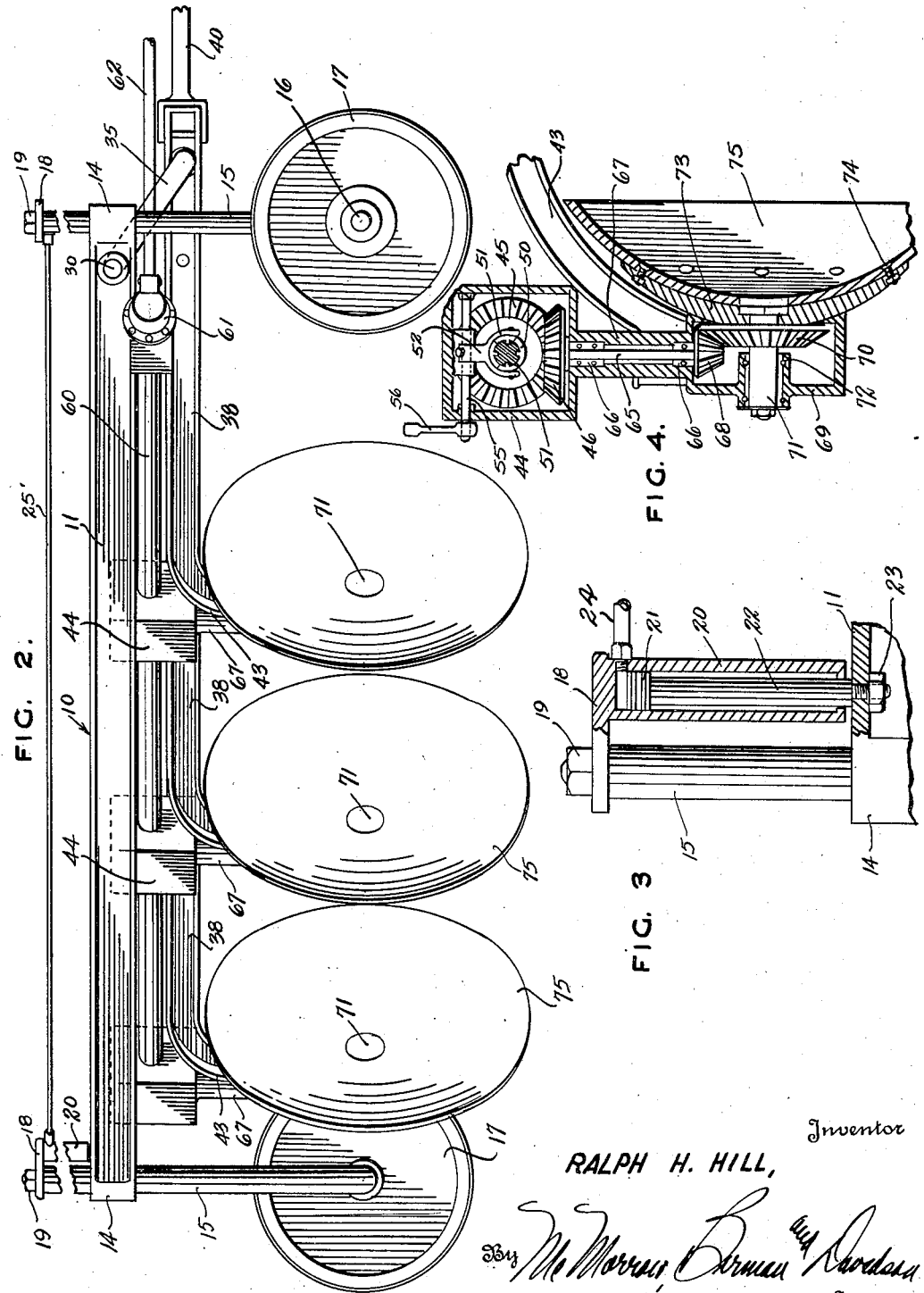
Inventor
RALPH H. HILL,
Attorneys Patented Dec. 6, 1949

2,490,688

UNITED STATES PATENT OFFICE 2,490,688

ROTARY DISK PLOW

Ralph H. Hill, Flint, Mich.

Application April 9, 1946, Serial No. 660,653

3 Claims. (Cl. 97—37)

This invention relates to a farm implement, and more particularly to such an implement of the rotary disc type, as a rotary disc plow or tillage implement.

A primary object of this invention is the provision of an improved device of this character adapted to be towed behind a tractor, or similar power-driven vehicle, having a power take-off, including means whereby the discs comprising an important feature of the invention may be rotated by the power take-off.

A further object of the invention is the provision of means whereby a plurality of discs may be simultaneously rotated, and whereby the speed of rotation of the discs may be readily varied as desired.

Still another object of the invention is the provision of means whereby the direction of rotation of each individual disc may be independently changed if desired.

A still further important object of the invention is the provision of means in association with such a device whereby the relative distance of the rotating discs below the frame of the device may be varied as desired.

A further object of the invention is the provision of hydraulic mechanism for effecting the last-mentioned object.

Other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 2 is a side elevational view of the device shown in Figure 1.

Figure 3 is an enlarged fragmentary detail view, partially in elevation and partially in section.

Figure 4 is an enlarged sectional view taken substantially along the line 4—4 of Figure 1, as viewed in the direction indicated by the arrows.

Similar reference characters refer to similar parts throughout the several views of the drawings.

Figure 1:
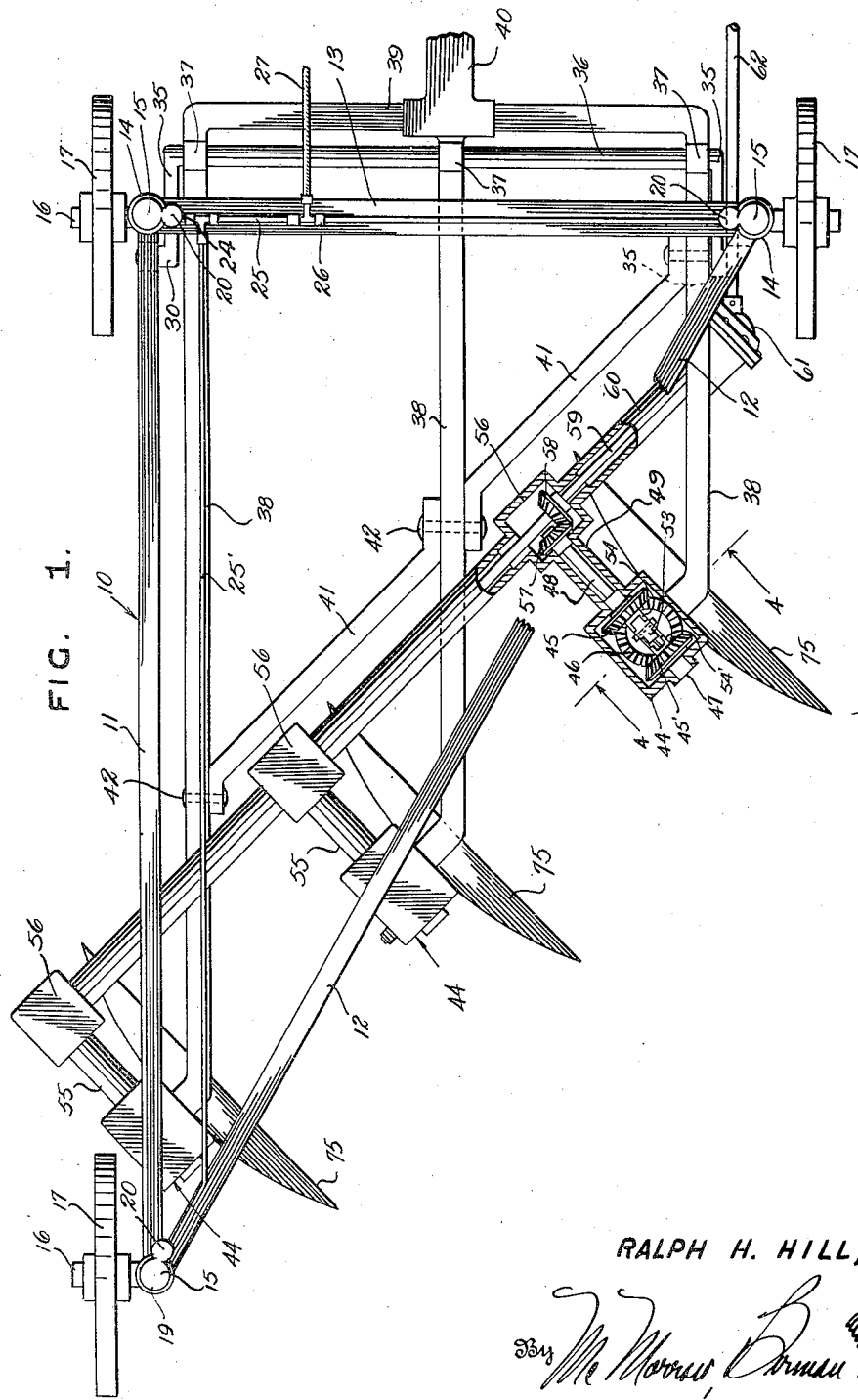
Figure 1 is a top plan view, partially in section, of one form of device embodying features of the instant invention.

Having reference now to the drawings, the device includes a triangular frame generally indicated at 10, and preferably of right-angled configuration, including two legs 11 and 12, and a base 13. At each angle of the triangle is provided a vertical sleeve 14, which carries a vertically depending shaft 15, which terminates in a right-angled portion forming a stub axle 16. Each axle 16 carries a wheel 17 mounted for rotation about a horizontal axis, upon which the entire assembly is supported and is adapted to travel.

The shafts 15 are freely slidable in the sleeves 14, and each carries at its upper extremity an extending lug 18, secured to the threaded upper extremity of each shaft 15 by a nut 19. As best shown in Figure 3, the extending portion of each lug 18 has secured thereto the upper portion of a cylinder 20, which contains a piston 21 secured to a piston rod 22, which in turn is secured, as by means of a nut 23, to the adjacent frame member. In Figure 3, the frame member is disclosed as the leg 11 of the triangular frame. Each sleeve 20 is provided with an inlet 24 for hydraulic fluid, and fluid lines 25 and 25' extend to each of the inlets 24. A T 26 in the line 25 permits the introduction of fluid from a main feeder line 27 extending to any desired source of fluid pressure, such as may be carried by the tractor.

It will now be readily apparent that the introduction of fluid through the lines 27, 25 and 25' to the cylinders 20 through its action on the pistons 21 varies the height of the frame 10 on the shaft 15, and correspondingly the height at which the frame is supported above the ground by the wheels 17 for a purpose to be more fully described hereinafter.

Each of the leg members 11 and 12 has journaled therein in a suitable sleeve the extremity 30 of a lever 35 which extends downwardly at an angle under the frame. The two levers 35 are connected by a transverse bar or rod 36 which extends substantially the full width of the base 13 of the triangular frame, passing through suitable sleeves 37 in each of three longitudinally extending parallel members 38, connected at one extremity, as by a transverse frame member 39. The frame member 39 has an extending portion 40 which may terminate in a clevis or other desired implement for attachment to the towing vehicle.

Angularly disposed reinforcing members 41 are secured, as by means of bolts 42 between the parallel members 38. Each of the members 38 terminates at its free extremity in a downwardly depending portion 43, which supports a gear box generally indicated at 44.

As best shown in Figures 1 and 4, each gear box 44 contains a transmission comprised of a pair of opposed bevel gears 45 and 45' engaging a horizontal bevel gear 46. The bevel gear 45 is mounted on a stub shaft 47 journaled for rotation in one wall of the gear box, and grooved, as best shown in Figure 4, to engage splines 50 carried by a bifurcated member 51. The member 51 has an upstanding portion 52 which carries a horizontally extending member 53 adapted selectively to engage in channels 54 and 54' carried by the gears 45 and 45', respectively. Shifting of the member is effected by a rod 55 mounted in the gear box 44 and manually controlled by a hand lever 56. Obviously, when the member 53 is moved to engage the channel 54 carried by the gear 45, the gear 46 is rotated in one direction, and when moved to engage the channel 54' carried by the gear 45', the gear 46 is rotated in the opposite direction. Power is supplied to the shaft 48, which extends through a housing 49 to a second gear box 56, through a bevel gear 57, which engages an opposed bevel gear 58 carried by a drve shaft 59 mounted in a housing 60, which extends angularly across the entire frame 10 and is supported in any desired manner thereby. The drive shaft 59 extends through a suitable universal joint 61 of any conventional type to a shaft 62, which in turn extends to the power take-off of the towing vehicle.

Referring now particularly to Figure 4, it will be seen that each gear 46 rotates a shaft 65 mounted in suitable bearings 66 within a sleeve 67 and carrying a bevel gear 68 mounted within an axle housing 69. Each bevel gear 66 drives a bevel gear 70 carried by a stub axle 71 journaled in bearings 72 in the housing 69. Each axle 71 carries a concavo-convex disc 73 on its inner extremity, which disc in turn has secured thereto, as by screws 74, a cultivating disc 75.

From the foregoing the operation of the device should now be readily understandable. It will be apparent that the discs 75 through the gear arrangement previously described may be rotated independently in either direction, and at varying speeds in accordance with the speed of rotation of the drive shaft 62. It will also be apparent that the depth to which the cultivating discs 75 are set may be readily varied by the hydraulic system previously described. Thus, it will be seen that the device may be used for variety of cultivating or plowing operations, the depth of the furrow or track left by each disc being controlled by the two factors of depth of cut and speed and direction of rotation. As an illustrative example, rotation of the middle disc 75 in a direction opposite to the two outside discs will result in a grinding or pulverizing operation, and not leave a well defined furrow. The depth of such pulverizing operation may be readily governed by the hydraulic mechanism. Correspondingly, rotating of all discs in the same direction, increasing the depth, and increasing the speed of rotation will result in well defined turned furrows when the device is used for a plow.

Thus, it will be seen that there is herein provided a device which accomplishes all the objectives of this invention, and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative and not in a limiting sense.

I claim:

1. A rotary disc plow comprising a frame, supporting wheels carried by said frame, a transverse rod carried by said frame, a plurality of longitudinally-extending members arranged in parallel spaced relation and connected to said rod, a transverse frame member adapted for attachment to a towing vehicle connected to said longitudinally-extending members, a disc mounted for rotation about a horizontal axis carried by each of said longitudinally-extending members, a separate gear means operatively connected to each of said discs for rotating the latter in either direction, a common drive shaft operatively connected to each of said gear means adapted to be connected to the power take-off of the towing vehicle, and a hydraulic actuable means operatively connected to each of said supporting wheels and to said frame for raising and lowering the frame to thereby shift the discs in the required position for engagement with the surface of the ground.

2. A rotary disc plow comprising a frame, a vertically disposed shaft carrying a wheel mounted for rotation about a horizontal axis arranged at each end of said frame and mounted for slidable movement, a plurality of longitudinally-extending members arranged in parallel spaced relation and carried by said frame, a transverse frame member connected to said longitudinally-extending members and adapted for attachment to a towing vehicle, a disc mounted for rotation about a horizontal axis carried by each of said longitudinally-extending members, and a hydraulic actuable means operatively connected to each of said shafts and to said frame for raising and lowering the latter to thereby shift the discs to the required position for engagement with the surface of the ground.

3. A rotary disc plow comprising a frame, a vertically-disposed shaft carrying a wheel mounted for rotation about a horizontal axis arranged at each end of said frame and mounted for slidable movement, a plurality of longitudinally-extending members arranged in parallel spaced relation and carried by said frame, a transverse frame member connected to said longitudinally-extending members and adapted for attachment to a towing vehicle, a disc mounted for rotation about a horizontal axis carried by each of said longitudinally-extending members, a separate gear means operatively connected to each of said discs for rotating the latter in either direction, a common drive shaft operatively connected to each of said gear means adapted to be connected to the power take-off of the towing vehicle, and a hydraulic actuable means operatively connected to each of said shafts and to said frame for raising and lowering the latter to thereby shift the discs to the required position for engagement with the surface of the ground.

RALPH H. HILL.

REFERENCES CITED

The following references are of record in the file of this patent:

UNITED STATES PATENTS

| Number | Name | Date |
| --- | --- | --- |
| 918,128 | Cook | Apr. 13, 1909 |
| 1,561,618 | Skinner | Nov. 17, 1925 |
| 1,892,485 | Dufour | Dec. 27, 1932 |

FOREIGN PATENTS

| Number | Country | Date |
| --- | --- | --- |
| 605,659 | France | May 31, 1926 |
| 755,646 | France | Nov. 28, 1933 |